July 24, 1934.     A. Y. DODGE     1,967,398
BRAKE
Filed Oct. 10, 1928     2 Sheets-Sheet 1

INVENTOR
Adiel Y. Dodge
BY
H. O. Clayton
ATTORNEY

July 24, 1934.  A. Y. DODGE  1,967,398
BRAKE
Filed Oct. 10, 1928  2 Sheets-Sheet 2

INVENTOR
Adiel Y. Dodge
BY
H. O. Clayton
ATTORNEY

Patented July 24, 1934

1,967,398

UNITED STATES PATENT OFFICE 1,967,398

BRAKE

Adiel Y. Dodge, South Bend, Ind., assignor to Bendix Brake Company, South Bend, Ind., a corporation of Illinois Application October 10, 1928, Serial No. 311,511

21 Claims. (Cl. 188—78)

This invention relates to internal expanding brakes and is illustrated as embodied in a brake for any one of the road wheels of an automobile. An object of the invention is to improve the efficiency of brakes of this type by substituting for the usual T-section shoes a plurality of shoes of novel form adapted to be actuated by a novel lever and link combination.

In one desirable arrangement there are provided two substantially L-sectioned shoes of such combined length as to contact the major portion of the drum flange and preferably arranged with the web or vertical portion of each shoe in face to face contact with the brake supporting or backing plate.

A further important feature of novelty relates to the actuating means for the shoes which preferably comprises a novel combination of bell crank lever and thrust link, both members lying substantially without the backing plate and having means passing through the plate to engage the shoes.

Another feature of novelty involves a novel connection between the lever and link and preferably comprises a pivoted clevis provided with a stem for adjustable engagement with the thrust link.

The above and other objects and features, including the employment of novel abutments, will be apparent from the following description of one illustrative embodiment shown in the accompanying drawings, in which.

Figure 1:
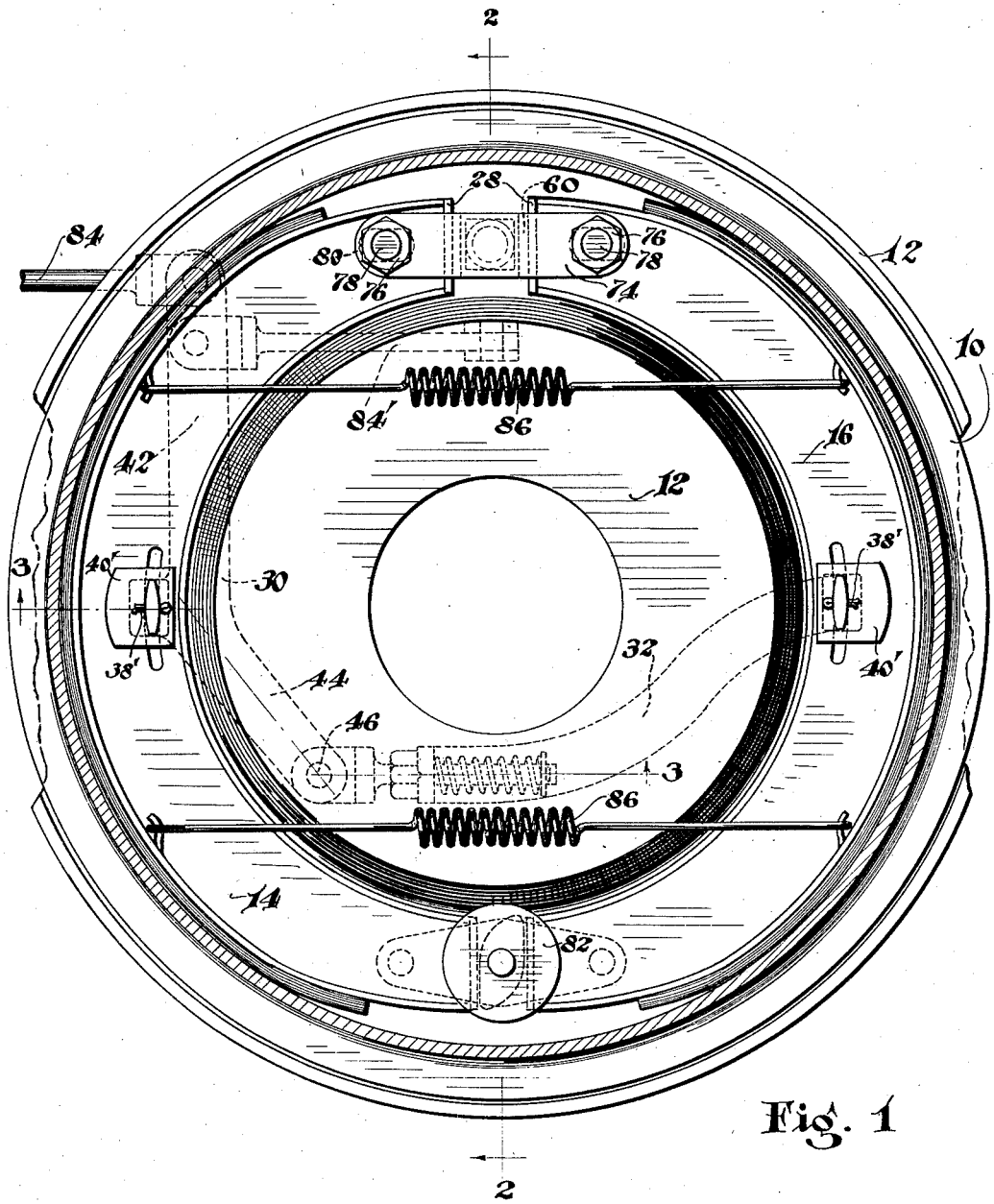
Figure 1 is a vertical section through the brake just inside the head of the drum, showing the shoes in elevation and the applying means in dotted lines.
Figure 2:
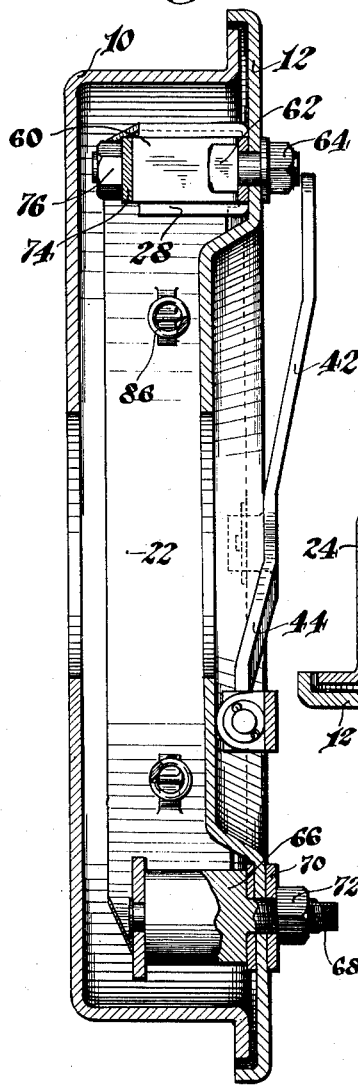
Figure 2 is a section taken on the line 2—2 of Figure 1.
Figure 4:
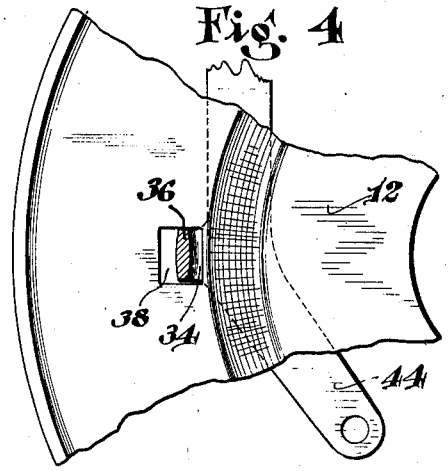
Figures 4 and 5 are fragmentary views disclosing respectively the association of the lever with the backing plate and shoe.

The brake in the form illustrated includes the rotatable drum 10 of the left rear wheel and is provided, at its open side, with a suitable stationary support or backing plate 12 adapted to be secured to the rear axle housing.

The brake structure is equally adaptable, however, to any one of the four wheels of an automotive vehicle for it is obvious that the backing plate may, with slight alteration, be attached to the steering knuckle of a front wheel spindle.

Within the backing plate are arranged two substantially L-sectioned shoes 14 and 16 with the web portion 18 of each shoe preferably extending in face to face contact with a high spot or raised portion 20 in the backing plate. The rim portion 22 of each shoe is covered with suitable lining 24 and extends outwardly toward the head of the drum 10.

Each shoe is preferably provided with a relatively narrow laterally extending reinforcing flange 26 at the inner edge of the web 18 and may also be provided with a relatively narrow laterally and outwardly extending abutment plate 28 at each end of the shoe. These plates may comprise turned-in portions of the rim 22, but are preferably separate stampings welded to the end edges of the rim, web and flange 26, thus insuring a rigid structure.

The shoes are forced against the drum in applying the brake by my novel lever and thrust link actuating means preferably comprising a bell crank lever 30 pivotally connected to a thrust link 32. The lever and link both extend in parallel relation to the backing plate lying without the same.

Lever 30 may be provided at the apex of its angle with a laterally extending boss 34 provided at its end with a relatively short and narrow flange 36 extending substantially at right angles to the plane of the lever and preferably adapted to pass with some play substantially through a rectangular slot 38 in the backing plate and an arcuate slot 40 in the shoe 14. A corrugated spring clip 40′ together with a cotter pin 38′ may be provided to connect the lever with the shoe.

The longer arm 42 of lever 30 preferably extends substantially perpendicular to the ground and the short angularly extended arm 44 is preferably pivotally connected at 46 to a clevis 48, the latter preferably provided with a stem having a threaded engagement with a laterally extending end flange 52 on the thrust link 32. A compression spring 54 may be interposed between the flange 52 and a suitable stop 56 on the stem functioning, together with lock nut 58, to retain the relative adjustment of stem and link. Beyond the stem, thrust link 32 may be curved upwardly, as disclosed, and connected to shoe 16 by a plate construction identical with the connection between the lever 30 and these parts.

Anchoring abutments are provided between the two shoes in the illustrated embodiment, the upper anchor preferably comprising a U-shaped stamping 60 the arms of which are of substantially the same width as the contiguous abutment plate 28. Anchor 60 may be secured in place by nuts 62 and 64 with suitable washers interposed between the parts. The lower abutment is preferably adjustable and may comprise a double cam 66, the opposite working faces of which are identical, each including a plain portion and a portion formed on an involute curve.

Cam stop 66 may be provided with a threaded stem 68 passed through the backing plate and a reinforcing plate 70, a lock nut 72 preferably retaining the adjustment. A strap 74 secured by nuts 76 to pins 78 passing through slots 80 in the juxtaposed shoes, together with a circular plate 82 on the cam 66 may be provided serving as guides for the shoes obviating lateral movement of the same.

In operation, longitudinal pulling movement of the rod 84 connected by suitable linkage to the service pedal or a pushing of link 84' in the front wheel construction effects a corresponding movement of the lever 30 the latter riding bodily along the slot 38 in the backing plate carrying with it the attached shoe. This movement is relatively slight but once drum engagement is effected the shoe is immediately wrapped by the revolving drum into anchoring engagement with either one of the two anchors depending upon the direction of rotation of the drum. Continued brake pressure results in the fulcruming of the lever at the boss portion thereof to force the connected thrust link with its attached shoe laterally to apply the shoe.

Clockwise movement of the drum effects an anchorage of shoe 14 on U stamping 60 and shoe 16 on the cam 66; counterclockwise movement of the drum with the forward motion of the car effects a reverse operation. With the brake released return springs 86 urge the shoes out of drum contact against the anchors, the lower of which is adjustable. This adjustment, as is obvious from the dotted showing in Figure 1, changes the contact points between the cam and adjacent shoes thus compensating for excessive clearance between the parts due to wear and incidentally affecting the braking action of the shoes depending upon the radial distance between said contact parts and the geometrical center of the brake. Adjustment for pedal travel may be effected by the novel adjustable clevis stem with respect to the thrust link.

The arrangement illustrated is an improvement over the usual brake construction in that it permits of relatively short and smaller anchors to take the braking torque, thereby obviating the usual decided overhang between the backing plate and torque taking area of the anchor. With my invention employing an L-sectioned shoe, the thrust is taken by the anchor immediately adjacent the backing plate, thereby relieving the latter of the excessive strains of the conventional brake shoe.

Figure 3:
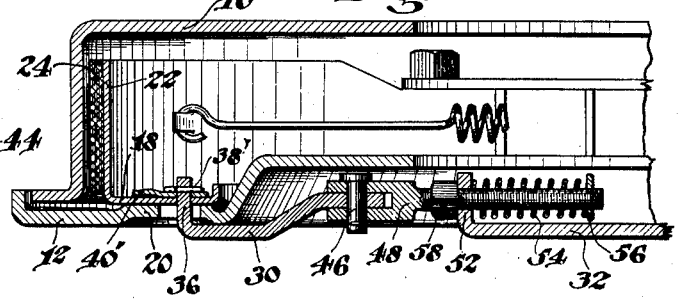
Figure 3 is a section taken on the line 3—3 of Figure 1 disclosing in more detail the applying means with its connection to one of the brake shoes.
Figure 5:
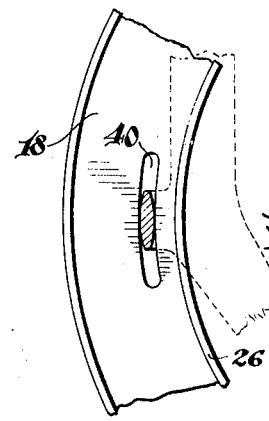

It is also to be noted that with my arrangement the objectionable effects of drum distortion or so-called bell mouthing is to a large extent obviated. This is best explained with reference to Figure 3. With the application of the brake shoes, the flanged and unsupported edge portion of the drum is moved or distorted outwardly inclining the braking flange with respect to the drum head. The substantially inflexible conventional T shoe does not readily lend itself to this inclination or bell mouthing. With my novel brake construction, however, thrust of the shoe is taken at the outer edge of the braking flange, the rim of the shoe being unsupported at its edge adjacent the drum head thereby readily flexing and compensating for the inclined position taken by the braking flange.

While one illustrative embodiment has been described in detail, it is not my intention to limit the invention thereto, but only as far as may be indicated by the scope of the appended claims.

It is not my intention to claim in this application any of the subject-matter of my prior application No. 234,310 filed November 19, 1927.

I claim:

1. A brake comprising, in combination, a drum inclined in operation to bell mouth, a backing plate an angular sectioned shoe adapted to retard movement of said drum and in so doing the distorted to conform to the drum in its distorted condition, and an applying lever outside the backing plate having a pivotal mounting at its end and having intermediate its ends a part extending through the backing plate and operatively engaging the shoe.

2. A brake comprising, in combination, a drum, a backing plate, a shoe between the drum and plate, and an intermediately pivoted lever outside the backing plate having its end linked to the shoe.

3. A brake comprising, in combination, a drum provided with a braking flange, a backing plate at the open side of the drum, substantially right angular friction means adapted to retard movement of said drum and having its web adjacent said backing plate, the drum contacting portion of said friction means conforming with the braking flange during the application of said friction means, and an operating device adjacent the backing plate pivotally engaging near its center one part of the friction means and having its end linked to another part of the friction means.

4. In a brake, friction means, a U-shaped clip narrower than the friction means and adapted to serve as an anchor in taking the braking torque.

5. A brake comprising, in combination, an L-sectioned brake shoe provided with a relatively narrow anchoring abutment plate at the end thereof, together with a correspondingly narrow cam serving as an anchor for said shoe, and an operating device engaging the web of the shoe approximately at the center of the shoe.

6. A brake comprising, in combination, an L-sectioned brake shoe having an abutment plate secured to its end edges, together with an anchor for engagement with said plate, said plate and anchor being coextensive and relatively narrow, and an operating lever having a short lateral projection engaging the web of said shoe.

7. A brake comprising, in combination, a plurality of L-sectioned brake shoes, together with a plurality of anchors for the same, one of said anchors being adjustable, and an operating lever engaging one shoe and linked to the other shoe.

8. A brake comprising, in combination, L-sectioned brake shoes provided with narrow abutment means at their ends and anchors for said shoes corresponding in width to said abutment means, and applying means acting on the midportions of said shoes.

9. In a brake, the combination with a narrow double cam having flat and curved surfaces, a fixed anchor across the brake from said cam of a plurality of L-sectioned brake shoes adapted for selective anchoring on said cam and said anchor respectively in the braking operation.

10. In a brake, the combination with an adjustable cam having a flat and a curved surface, of an L-sectioned brake shoe provided with an abutment plate adapted to contact with said cam, and an operating lever arranged to act on the mid-portion of said shoe.

11. A brake comprising, in combination, a narrow U-shaped stamping adapted to serve as an anchor for a brake shoe, together with a brake shoe provided with a correspondingly narrow abutment plate on its end for engagement with said stamping.

12. In a brake structure, a backing plate provided with a plurality of pins projecting therefrom, a plurality of L-sectioned brake shoes, a narrow U-shaped stamping forming an anchor fastened to said plate and positioned between said shoes, together with a confining strap engaging said shoes and secured to said pins.

13. In a brake structure, a backing plate provided with a plurality of pins projecting therefrom, a plurality of L-sectioned brake shoes, a narrow U-shaped stamping forming an anchor fastened to said plate and positioned between said shoes, together with a confining strap engaging said shoes and secured to said pins, said pins passing through slots in said shoes.

14. A brake comprising, in combination, a plurality of L-sectioned brake shoes, actuating means for said shoes comprising a lever pivoted to the mid-portion of the web of one shoe and a link connecting the lever to the mid-portion of the web of the other shoe.

15. A brake comprising, in combination, two L-sectioned brake shoes, together with actuating means therefor comprising a bell crank lever connected to one shoe and linked to the other shoe.

16. In a brake mechanism, a backing plate, a plurality of brake shoes, together with actuating means therefor comprising a bell crank lever and a thrust link connected thereto, said link and lever lying without said plate and having parts extending through the plate and respectively operatively engaging said shoes.

17. A brake comprising, in combination, a backing plate, a brake shoe provided with a web portion contiguous to said plate and formed with an arcuate slot at its mid-portion and actuating means for said shoe lying without said plate and disconnectedly engaging the same and having a part extending through the backing plate and into said slot.

18. A brake comprising, in combination, a backing plate, a brake shoe having a web portion in face to face contact with said plate and formed with an arcuate slot, together with actuating means for said shoe comprising a lever having a flanged portion extending into said slot.

19. A brake comprising, in combination, a backing plate, a brake shoe having a web portion, together with actuating means for said shoe comprising a lever having a flanged portion engaging a slot in said shoe, said lever lying substantially without said slot.

20. A brake comprising, in combination, a backing plate provided with two anchors, a plurality of brake shoes of L-section and applying means acting on the mid-portions of said shoes, said means constructed and arranged to permit simultaneous anchoring of two of said shoes on said anchors.

21. A brake comprising a backing plate and an L-shaped brake shoe provided with a slot, the web of said shoe lying in contiguous relation to said plate and actuating means for said shoe passing through said plate and slot.

ADIEL Y. DODGE.